US010070057B2

(12) United States Patent
Chen et al.

(10) Patent No.: US 10,070,057 B2
(45) Date of Patent: Sep. 4, 2018

(54) SURVEILLANCE CAMERA DEVICE

(71) Applicant: VIVOTEK INC., New Taipei (TW)

(72) Inventors: Ching-Ching Chen, New Taipei (TW); Yen-Chieh Huang, New Taipei (TW); Jo-Wen Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/445,997

(22) Filed: Mar. 1, 2017

(65) Prior Publication Data
US 2017/0257567 A1    Sep. 7, 2017

(30) Foreign Application Priority Data

Mar. 1, 2016   (TW) .............................. 105106077 A

(51) Int. Cl.
*H04N 5/232* (2006.01)
*G01K 1/14* (2006.01)
*H01R 24/62* (2011.01)
*H01R 13/66* (2006.01)
*H01R 107/00* (2006.01)

(52) U.S. Cl.
CPC ........... *H04N 5/23241* (2013.01); *G01K 1/14* (2013.01); *H01R 13/6683* (2013.01); *H01R 24/62* (2013.01); *H01R 2107/00* (2013.01)

(58) Field of Classification Search
CPC .... H04N 5/23241; G01N 27/028; G01K 1/14; G01K 1/143; G01K 1/146; H05K 1/18; H05K 1/0243; H05K 1/023; H05K 1/16; H05K 1/0201; H05K 7/1427; H05K 2201/10151; H01R 24/62; H01R 13/6683; H01R 2107/00

USPC ......................................................... 348/374
See application file for complete search history.

(56) References Cited

U.S. PATENT DOCUMENTS

| 8,259,221 | B1* | 9/2012 | Kaplan | H02J 7/0055 |
| | | | | 320/114 |
| 9,213,361 | B1* | 12/2015 | Urban | G01K 1/14 |
| 9,323,136 | B2* | 4/2016 | Huang | H04N 5/23206 |
| 2003/0174206 | A1* | 9/2003 | Moroz | H04N 7/185 |
| | | | | 348/81 |
| 2012/0041284 | A1* | 2/2012 | Krishnan | A61B 5/0075 |
| | | | | 600/306 |

(Continued)

FOREIGN PATENT DOCUMENTS

CN    204859412 U    12/2015
TW    201043011 A1   12/2010

*Primary Examiner* — Pritham Prabhakher
(74) *Attorney, Agent, or Firm* — Winston Hsu

(57) ABSTRACT

A surveillance camera device receives power transmitted from an external power source and includes a camera for capturing images, a cable module coupled to the camera and the external power source, a casing disposed on the cable module, a temperature/moisture sensor and a circuit board. The temperature/moisture sensor is disposed in the casing for detecting a temperature/moisture value. The circuit board is disposed in the casing. The circuit board is coupled to the temperature/moisture sensor and coupled to the camera and the external power source via the cable module for transmitting the power transmitted from the external power source and the temperature/moisture value transmitted from the temperature/moisture sensor to the camera via the cable module.

6 Claims, 3 Drawing Sheets

(56) References Cited

U.S. PATENT DOCUMENTS

| | | | | |
|---|---|---|---|---|
| 2014/0320280 A1* | 10/2014 | Sager | .................. | H04Q 9/00 |
| | | | | 340/501 |
| 2015/0062417 A1* | 3/2015 | Sheng | .................. | G03B 17/55 |
| | | | | 348/372 |
| 2015/0103187 A1* | 4/2015 | Schieltz | ................ | H04N 5/232 |
| | | | | 348/187 |
| 2015/0180180 A1* | 6/2015 | Kim | .................. | H01R 13/7137 |
| | | | | 439/620.08 |
| 2015/0181105 A1* | 6/2015 | Huang | .............. | H04N 5/23206 |
| | | | | 348/211.2 |
| 2015/0256747 A1* | 9/2015 | Grotto | .............. | H04L 12/40045 |
| | | | | 348/143 |
| 2015/0310726 A1* | 10/2015 | Sager | .................. | H04Q 9/00 |
| | | | | 340/539.13 |
| 2016/0006201 A1* | 1/2016 | Kim | .................. | H01R 13/6205 |
| | | | | 439/37 |
| 2016/0065844 A1* | 3/2016 | Yao | .................. | H04N 5/23241 |
| | | | | 348/207.11 |
| 2016/0341541 A1* | 11/2016 | Bridges | ................ | G01B 11/002 |
| 2017/0108235 A1* | 4/2017 | Guan | .................... | G05B 19/04 |
| 2017/0147047 A1* | 5/2017 | Curtis | .................... | G06F 1/206 |
| 2017/0149180 A1* | 5/2017 | Siegler | .................. | H01H 89/00 |
| 2017/0219442 A1* | 8/2017 | Musin | .................... | G01K 11/32 |

* cited by examiner

SURVEILLANCE CAMERA DEVICE

BACKGROUND OF THE INVENTION

1. Field of the Invention

The present invention relates to a surveillance camera device, and more specifically, to a surveillance camera device disposing a temperature/moisture sensor in a cable module located outside a camera.

2. Description of the Prior Art

With development of image surveillance technology, a surveillance camera device for providing surveillance images could further provide other related information so that a user could know real-time environmental conditions at a surveillance region more clearly. For example, in home care application, the surveillance camera device could have a temperature/moisture sensor installed therein for providing a temperature/moisture monitoring function.

However, since the aforesaid temperature/moisture sensor could be influenced easily by the internal temperature/moisture of the surveillance camera device, the surveillance camera device could not provide accurate temperature/moisture values for the surveillance region (e.g. baby room), so as to limit the practical surveillance application of the surveillance camera device and cause the user much inconvenience in home care monitoring.

SUMMARY OF THE INVENTION

The present invention provides a surveillance camera device for receiving a power transmitted from an external power source. The surveillance camera device includes a camera, a cable module, a casing, a temperature/moisture sensor, and a circuit board. The camera is used for capturing images. The cable module is coupled to the camera and the external power source. The casing is disposed on the cable module. The temperature/moisture sensor is disposed in the casing for detecting a temperature/moisture value. The circuit board is disposed in the casing. The circuit board is coupled to the temperature/moisture sensor and is coupled to the camera and the external power source via the cable module for transmitting the power transmitted from the external power source and the temperature/moisture value transmitted from the temperature/moisture sensor to the camera via the cable module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
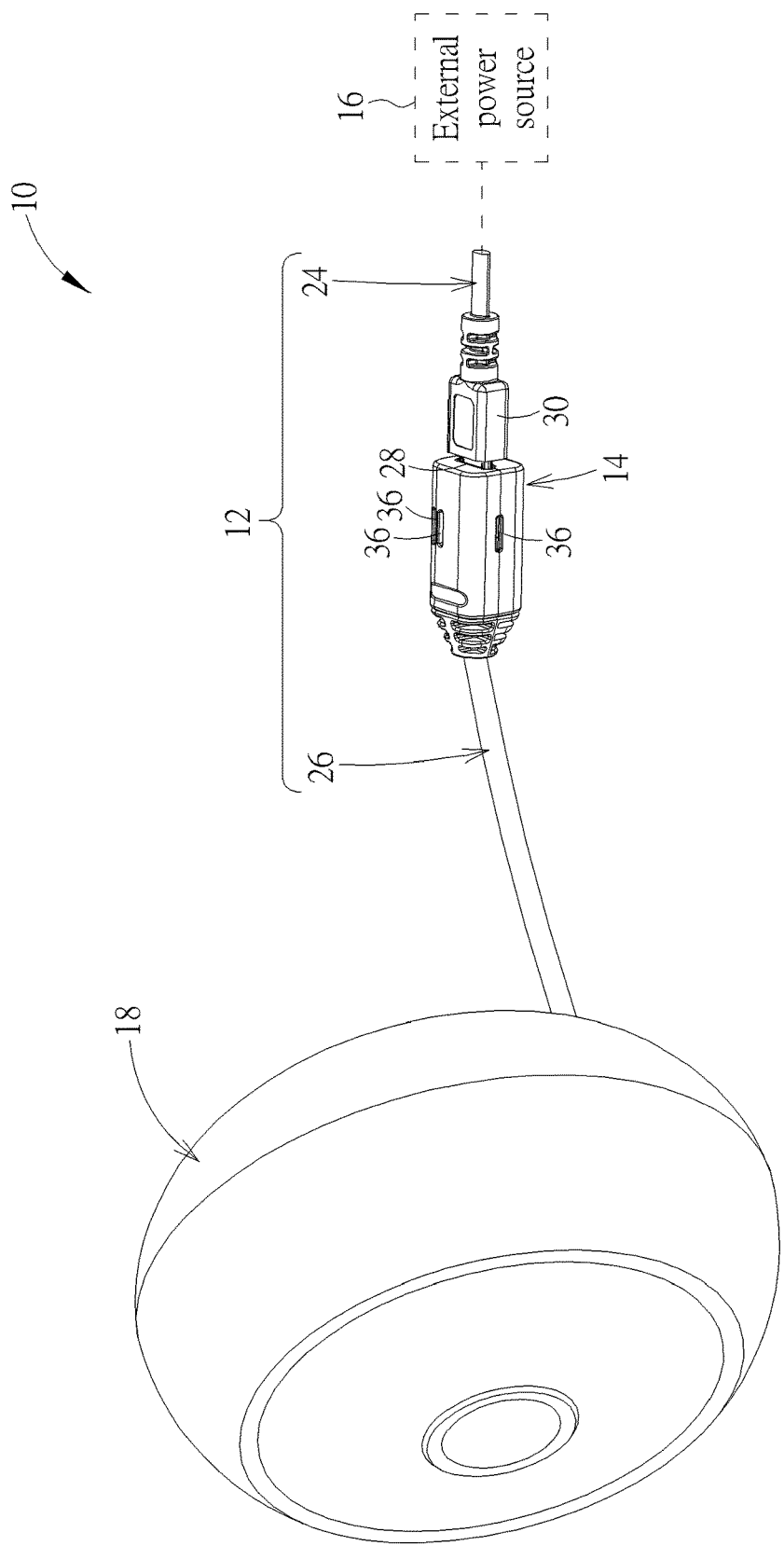
FIG. 1 is a diagram of a surveillance camera device according to an embodiment of the present invention.
Figure 2:
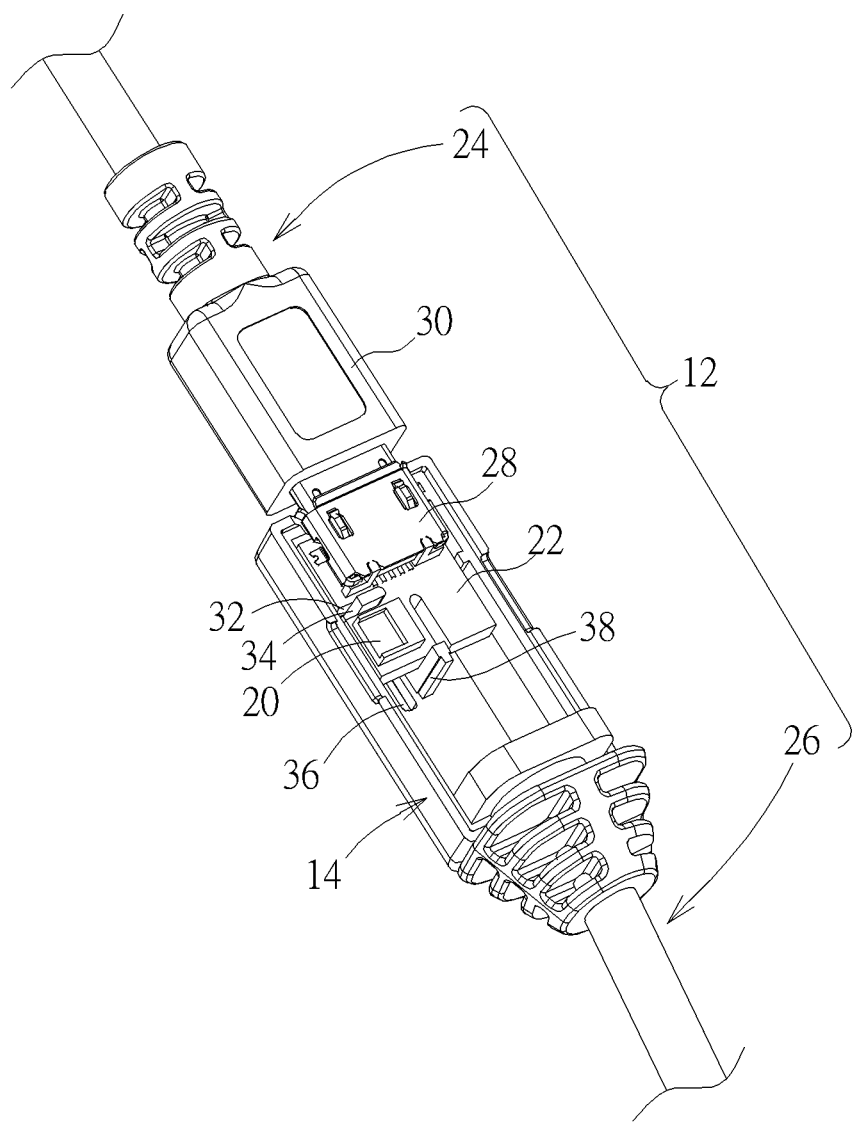
FIG. 2 is a partial internal diagram of a cable module in FIG. 1.

Please refer to FIG. 1 and FIG. 2. FIG. 1 is a diagram of a surveillance camera device 10 according to an embodiment of the present invention. FIG. 2 is a partial internal diagram of a cable module 12 in FIG. 1. For clearly showing the internal design of the cable module 12, a casing 14 is partially depicted in FIG. 2. The surveillance camera device 10 can receive power transmitted from an external power source 16 (briefly depicted by dotted lines in FIG. 1) for performing a related surveillance operation (e.g. image surveillance, temperature/moisture monitoring, etc.). As shown in FIG. 1 and FIG. 2, the surveillance camera device 10 includes the cable module 12, the casing 14, a camera 18, a temperature/moisture sensor 20, and a circuit board 22. In this embodiment, the cable module 12 could include a first cable 24 and a second cable 26. The first cable 24 is electrically connected to the circuit board 22 and the external power source 16 for transmitting the power to the circuit board 22. The second cable 26 is electrically connected to the circuit board 22 and the camera 18 for transmitting the power transmitted by the external power source 16 and a temperature/moisture value detected by the temperature/moisture sensor 20 to the camera 18 via the circuit board 22.

In practical application, for preventing the camera 18 from having an excessively long cable, which causes the user much inconvenience in cable containing and mounting of the surveillance camera device 10, as shown in FIG. 1 and FIG. 2, the cable module 12 could adopt the detachable plug design for efficiently reducing the length of the second cable 26 (but not limited thereto, meaning that the cable module 12 could adopt the design that the first cable 24 is directly connected to the circuit board 22 to form one single cable cooperatively with the second cable 26 and the circuit board 22 in another embodiment to omit the detachable plug design for simplifying the cable design of the cable module 12). To be more specific, in this embodiment, the circuit board 22 could have a transmission port 28 and the first cable 24 could have a transmission plug 30. The transmission port 28 could preferably be a USB (Universal Serial Bus) port (but not limited thereto), and the transmission plug could correspondingly be a USB connector. Accordingly, the transmission plug 30 could be detachably inserted into the transmission port 28 for establishing power transmission between the circuit board 22 and the external power source 16.

As shown in FIG. 1 and FIG. 2, the camera 18 could be an image surveillance apparatus commonly applied to image surveillance for a desired surveillance region (e.g. baby room). The temperature/moisture sensor 20 is disposed in the casing 14 for detecting a temperature/moisture value. The circuit board 22 is disposed in the casing 14. The circuit board 22 is electrically connected to the temperature/moisture sensor 20 and electrically connected to the camera 18 and the external power source 16 via the cable module 12. Furthermore, in this embodiment, at least one positioning slot 32 (one shown in FIG. 2, but not limited thereto) is formed on the circuit board 22 and is adjacent to the temperature/moisture sensor 20, so that the circuit board 22 could be disposed in the casing 14 steadily by a conventional fixing method (e.g. by a structural engagement method, a method for locking the circuit board 22 in the casing 14 by screwing a screw into the positioning slot 32, etc.). Moreover, for further preventing the temperature/moisture sensor 20 from being influenced by heat energy generated by the circuit board 22 in the casing 14, in this embodiment, the casing 14 could preferably have a blocking sheet 34 protruding inwardly toward the positioning slot 32. The blocking sheet 34 could pass through the positioning slot 32 and protrude from the circuit board 22 to be located at a side of the temperature/moisture sensor 20. In such a manner, via the structural engagement design that the blocking sheet 24 is disposed through the positioning slot 32, the circuit board 22 could be disposed in the casing 14 steadily and the present invention could block the heat energy generated by the circuit board 22 via the blocking sheet 34 from being directly transmitted to the temperature/moisture sensor 20 (as shown in FIG. 2), so as to improve the detecting accuracy of the temperature/moisture sensor 20.

Figure 3:
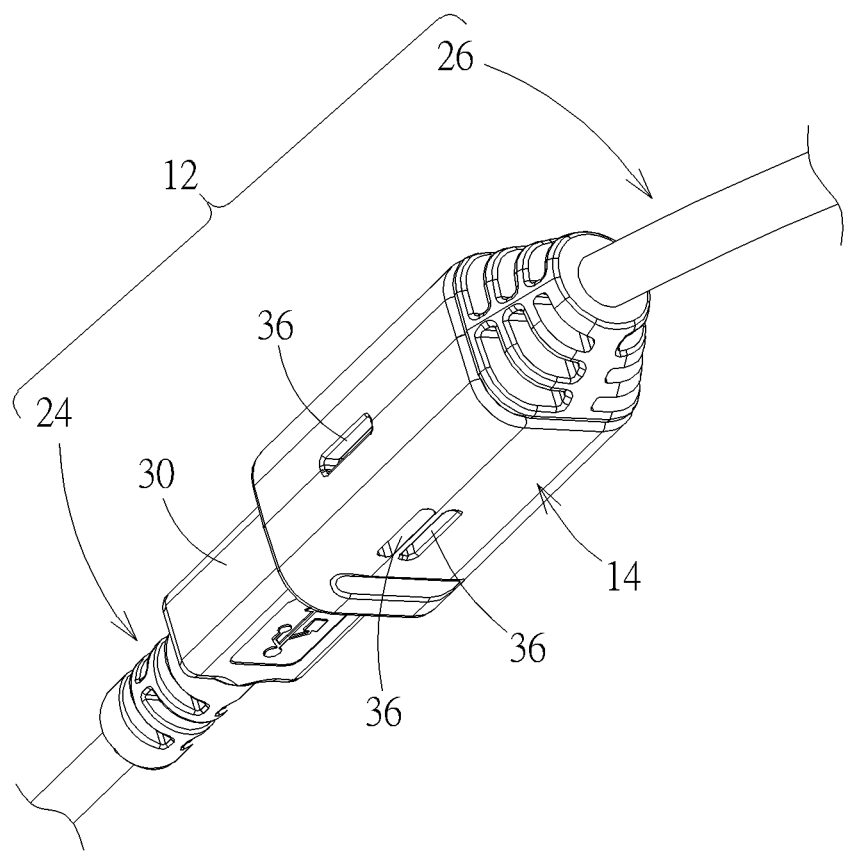
FIG. 3 is an enlarged diagram of the cable module in FIG. 1 from another viewing angle.

Moreover, please refer to FIG. 2 and FIG. 3. FIG. 3 is an enlarged diagram of the cable module 12 in FIG. 1 from another viewing angle. As shown in FIG. 2 and FIG. 3, at least one through slot hole 36 (six respectively formed on an upper side, a bottom side and left and right sides of the casing 14 in this embodiment, but not limited thereto) is formed on the casing 14 corresponding to the temperature/moisture sensor 20. Accordingly, the internal space of the casing 14 for containing the temperature/moisture sensor 20 could be communicated with the external environment surrounding the surveillance camera device 10, so that the temperature/moisture sensor 20 could detect the temperature/moisture value of the external environment surrounding the surveillance camera device 10 precisely via the through slot hole 36. Furthermore, as shown in FIG. 2, the casing 14 could preferably have a support base 38 extending inwardly toward the circuit board 22 for supporting the circuit board 22 to be positioned in the casing 14, so that the circuit board 22 could be disposed in the casing 14 more steadily.

Via the aforesaid design, when the user wants to utilize the surveillance camera device 10 to perform the image surveillance operation, the user just needs to insert the transmission plug 30 electrically connected to the external power source 16 into the transmission port 28 for establishing power transmission between the external power source 16 and the camera 18 after the mounting operation of the camera 18 is completed (e.g. mounting the camera 18 on a desktop stand or disposing the camera 18 on a baby crib in a screw locking manner). Accordingly, the circuit board 22 could transmit the power, which is transmitted from the external power source 16 via the first cable 24, to the camera 18 via the second cable 26, so that the camera 18 could be turned on to perform the image surveillance operation. Simultaneously, the temperature/moisture sensor 20 could detect the temperature/moisture value of the external environment surrounding the surveillance camera device 10. Since signal transmission between the temperature/moisture sensor 20 and the camera 18 has already been established by the circuit board 22 and the second cable 26, the circuit board 22 could transmit the temperature/moisture value detected by the temperature/moisture sensor 20 to the camera 18 via the second cable 26. In such a manner, compared with the prior art utilizing two separate cables (i.e. one single signal cable and one single power cable respectively connected to the camera) for performing power transmission and signal transmission of the camera, the surveillance camera device 10 could transmit the power transmitted from the first cable 24 connected to the external power source 16 and the signal (e.g. the aforesaid temperature/moisture value) transmitted from the circuit board 22 to the camera 18 via only one single cable (i.e. the second cable 26) at the same time, for providing image surveillance and environmental surveillance functions. Thus, the present invention could improve convenience of the surveillance camera device 10 in mounting of the camera 18 and cable containing as well as flexibility in the surveillance application of the surveillance camera device 10.

In summary, compared with the prior art directly disposing the temperature/moisture sensor in the surveillance camera device, the present invention adopts the design that the temperature/moisture sensor is disposed in the cable module located outside the camera, to ensure that the temperature/moisture sensor could detect the temperature/moisture value of the external environment surrounding the surveillance camera device precisely without being influenced by the internal temperature/moisture of the camera. In such a manner, the monitoring accuracy of the surveillance camera device could be improved greatly, so that the user could utilize the surveillance camera device provided by the present invention to perform a more comprehensive and thorough surveillance operation (e.g. home care monitoring) on a desired surveillance region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A surveillance camera device for receiving a power transmitted from an external power source, the surveillance camera device comprising:
   a camera for capturing images;
   a cable module coupled to the camera and the external power source;
   a casing disposed on the cable module;
   a temperature/moisture sensor disposed in the casing for detecting a temperature/moisture value; and
   a circuit board disposed in the casing, the circuit board being coupled to the temperature/moisture sensor and being coupled to the camera and the external power source via the cable module for transmitting the power transmitted from the external power source and the temperature/moisture value transmitted from the temperature/moisture sensor to the camera via the cable module, at least one positioning slot being formed on the circuit board and being adjacent to the temperature/moisture sensor, the casing having a blocking sheet protruding inwardly toward the at least one positioning slot, and the blocking sheet passing through the at least one positioning slot to position the circuit board in the casing and protruding from the circuit board to be located at a side of the temperature/moisture sensor for blocking heat energy generated by the circuit board from being transmitted to the temperature/moisture sensor.

2. The surveillance camera device of claim 1, wherein the cable module comprises:
   a first cable coupled to the circuit board and the external power source for transmitting the power to the circuit board; and
   a second cable coupled to the circuit board and the camera for transmitting the power and the temperature/moisture value to the camera.

3. The surveillance camera device of claim 2, wherein the circuit board has a transmission port, the first cable has a transmission plug, and the transmission plug is inserted into the transmission port for establishing power transmission between the circuit board and the external power source.

4. The surveillance camera device of claim 3, wherein the transmission port is a USB (Universal Serial Bus) port, and the transmission plug is a USB connector.

5. The surveillance camera device of claim 1, wherein at least one through slot hole is formed on the casing corresponding to the temperature/moisture sensor.

6. The surveillance camera device of claim 1, wherein the casing has a support base extending inwardly toward the circuit board, and the support base supports the circuit board in the casing.

* * * * *